US012774241B2

(12) United States Patent
Dumenil et al.

(10) Patent No.: US 12,774,241 B2
(45) Date of Patent: Oct. 27, 2026

(54) METHOD AND SYSTEM FOR BREAKING OUT AT LEAST ONE MARGIN FROM A GLASS SHEET

(71) Applicant: SAINT-GOBAIN GLASS FRANCE, Courbevoie (FR)

(72) Inventors: Thierry Dumenil, Courbevoie (FR); Axel Nogret, Courbevoie (FR); Juan Felipe Giraldo Restrepo, Municipio de Ayala (MX)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 268 days.

(21) Appl. No.: 18/727,994

(22) PCT Filed: Jan. 10, 2023

(86) PCT No.: PCT/EP2023/050453
§ 371 (c)(1),
(2) Date: Jan. 29, 2025

(87) PCT Pub. No.: WO2023/135134
PCT Pub. Date: Jul. 20, 2023

(65) Prior Publication Data

US 2025/0162924 A1 May 22, 2025

(30) Foreign Application Priority Data

Jan. 11, 2022 (FR) ...................................... 2200168

(51) Int. Cl.
*C03B 33/033* (2006.01)
*C03B 33/04* (2006.01)
(Continued)

(52) U.S. Cl.
CPC ............ *C03B 33/033* (2013.01); *C03B 33/04* (2013.01); *C03B 33/07* (2013.01); *C03B 33/105* (2013.01)

(58) Field of Classification Search
CPC .............................. C03B 33/04; C03B 33/033
See application file for complete search history.

(56) References Cited

U.S. PATENT DOCUMENTS 3,532,260 A * 10/1970 Augustin ................ C03B 33/04
225/2
6,460,257 B1 10/2002 Shimotoyodome
(Continued)

FOREIGN PATENT DOCUMENTS

CN 101616778 A 12/2009
CN 105492397 A 4/2016
(Continued)

OTHER PUBLICATIONS

Office Action as issued in Chinese Patent Application No. 202380009583.1, dated Nov. 27, 2025.
(Continued)

*Primary Examiner* — Sean M Michalski
(74) *Attorney, Agent, or Firm* — CUSHMAN PARTNERS LLC

(57) ABSTRACT

The invention relates to a method for breaking out at least one part to be broken out, called a "margin" (12_1, 12_2, 12_3), from a glass sheet (10) bearing at least one cutting line (10_1, 10_2, 10_3) separating said at least one margin from an internal zone (13) of said glass sheet. Said method includes steps of:

gripping (E10) the glass sheet only in the internal zone, so as to hold the glass sheet in a position in which vibrations are able to propagate at the surface of said internal zone until said at least one cutting line is reached, vibrating (E20) said internal zone.

18 Claims, 4 Drawing Sheets

(51) Int. Cl.
*C03B 33/07* (2006.01)
*C03B 33/10* (2006.01)

(56) References Cited

U.S. PATENT DOCUMENTS

| | | | | |
|---|---|---|---|---|
| 6,824,639 | B1 * | 11/2004 | Hill | B44C 1/1716 428/137 |
| 7,982,162 | B2 * | 7/2011 | Abramov | B23K 26/0876 219/121.72 |
| 7,984,625 | B2 * | 7/2011 | Markham | C03B 17/067 65/95 |
| 8,245,539 | B2 * | 8/2012 | Lu | C03B 33/033 65/97 |
| 8,292,141 | B2 * | 10/2012 | Cox | C03B 33/0215 225/104 |
| 10,870,601 | B2 * | 12/2020 | Bayne | B65G 49/065 |
| 2006/0249553 | A1 * | 11/2006 | Ukrainczyk | C03B 33/033 225/2 |
| 2011/0126593 | A1 * | 6/2011 | Abdul-Rahman | C03B 33/033 65/97 |
| 2014/0130649 | A1 * | 5/2014 | Chang | C03B 33/033 83/26 |
| 2015/0343559 | A1 * | 12/2015 | Morikazu | C03B 33/091 65/112 |
| 2016/0152507 | A1 * | 6/2016 | Brown | B25B 11/005 269/21 |
| 2020/0325061 | A1 * | 10/2020 | Kimmel | C03B 33/033 |
| 2023/0256727 | A1 * | 8/2023 | Kanno | B32B 43/006 204/157.15 |
| 2025/0162924 | A1 * | 5/2025 | Dumenil | C03B 33/07 |

FOREIGN PATENT DOCUMENTS

| | | | |
|---|---|---|---|
| CN | 107892471 | A | 4/2018 |
| EP | 1 036 773 | A2 | 9/2000 |
| EP | 2 942 330 | A1 | 11/2015 |
| WO | WO 2008/148209 | A1 | 12/2008 |

OTHER PUBLICATIONS

International Search Report as issued in International Patent Application No. PCT/EP2023/050453, dated Apr. 6, 2023.

* cited by examiner

METHOD AND SYSTEM FOR BREAKING OUT AT LEAST ONE MARGIN FROM A GLASS SHEET

CROSS-REFERENCE TO RELATED APPLICATIONS

This application is the U.S. National Stage of PCT/EP2023/050453, filed Jan. 10, 2023 which in turn claims priority to French patent application number 2200168 filed Jan. 11, 2022. The content of these applications are incorporated herein by reference in their entireties.

PRIOR ART

The present invention belongs to the general field of cutting glass. It relates more particularly to a method for breaking out at least one margin from a glass sheet. It also relates to a system configured to implement said breaking-out method. The invention finds a particularly advantageous application, although in no way limiting, in the cutting of a glass sheet for the purpose of manufacturing a glazed unit for an automobile.

The term "margin" refers in the present description to a part to be broken (that is to be broken) off a glass sheet.

In order to achieve such breaking-out, two successive operations are carried out:

- a prior operation of tracing one or more cutting lines corresponding to surface fissures on the surface of the glass. This operation is called the "cutting" operation and is carried out using, for example, a glass-cutting wheel or a laser. This cutting operation therefore makes it possible to define an internal zone of the glass sheet, separated from the margins by the cutting lines and constituting the desired shape to be cut out;
- an operation of propagating the cutting lines through the thickness of the glass sheet; this operation is called the "breaking-out" operation and makes it possible to separate the margin(s) from the initial specimen of glass, called the primitive.

There are essentially two techniques for breaking out glass, depending on the complexity of the volume that is to be cut out.

Thus, for margins with a simple shape, that is to say, essentially with rectilinear edges, it is possible to use a rectilinear reverse breaking-out technique, illustrated in FIG. 1. This involves making a rectilinear through cutting, that is to say from one edge to the other, then placing the entire cutting line in extension by lifting the glass sheet along the entire length of the cutting line, for example by using a bar or one or more point contacts.

Nevertheless, this method does not make it possible to break out margins with complex shapes (that is shapes including a concave portion, or even a notch). Thus, for shapes with non-rectilinear contours, the starting point is a primitive with dimensions greater than the shape that is to be cut out. The different steps leading to breaking out are illustrated in FIGS. 2*a* to 2*d* (gathered in one single FIG. 2):

- the starting material is a primitive having the shape of a square (FIG. 2*a*), a rectangle or a trapezoid
- the contour of the margin(s) to be cut (FIG. 2*b*) is traced, for example using a glass-cutting wheel. Additional cutting lines in the form of straight segments can also be arranged at the periphery of the margins in order to facilitate their breaking out;
- the breaking out is done by a technique for local bending of the initial fissure by pressing on the margin or by gripping the margin. The bending is done by a lever arm mechanism by pressing on the glass sheet, outside the shape and at a limited number of points, on a hard or soft coating (FIG. 2*c*);
- the desired final shape is then isolated from the now-broken-out margins (FIG. 2*d*), and may optionally undergo shaping consisting of grinding.

FIGS. 3*a* to 3*d* (gathered in one FIG. 3) are cross-section diagrams of the breaking-out of a glass sheet by bending a cutting line of complex shape using a bending of the corresponding margin.

FIGS. 3*a* and 3*b* relate to the circumstance in which breaking out is performed on a soft belt. Force is applied to the offcut by pressing on it until it breaks out and the offcut is separated.

FIGS. 3*c* and 3*d* relate to an example of breaking out on a hard belt. The glass sheet is positioned with an overhang so that a force applied to the offcut, by pressure or by gripping, allows the glass sheet to be deformed until it breaks out.

Although the techniques described with reference to FIGS. 2*a* to 2*d* and 3*a* to 3*d* are conventionally used for breaking out complex-shaped margins, they do not have fewer disadvantages.

Thus, in the case of FIGS. 3*c* and 3*d* there is a sacrificial area of glass lost through the need to create the overhang for breaking out.

Furthermore, it is common to observe quality problems in the cutting of the complex shapes. This results from the fact that, when a margin is pressed, it is not generally possible to create a bending stress at any point of the cutting line associated with that margin. This is notably the case with inward-pointing shapes (that is concave portions in the shape that is to be cut out). In such cases it is possible to introduce bending into the glass at the entrance to the concave part, but as soon as the fissure has spread a little, and before the tool applying the pressure can be removed, the field of stresses at the head of the fissure is modified by the geometry of the cutting line. The pure bending that was applied at the start of the concave part quickly becomes a shear stress and causes chipping. What's more, in the case of shapes with a small radius, the fissure may spread beyond the initial cutting line and generate scrap.

Ultimately, it follows from the foregoing that the known breaking-out techniques are limited in terms of complex margins that can be produced, in particular in the case of geometries with small concave radii of curvature (deep curved areas).

Furthermore, even for curved margins of less complex shape, these techniques require adjustment of the positions and forces of the support points that are lengthy and difficult to carry out. It is also understood that the time devoted to making these adjustments negatively impacts the production of final forms of glasses, both in terms of quantities produced and costs.

Overview of the Invention

The present invention aims to remedy all or part of the disadvantages of the prior art, in particular those described above, by proposing a solution that makes it possible to break out one or more margins in a glass sheet more effectively than the solutions of the prior art.

The term "more effectively" refers here to the fact that it is possible to break out in a clean and precise manner (that is without flaking), as well as simultaneously, a plurality of margins of a glass sheet, regardless of the shape (simple and/or complex) of said margins. Furthermore, a more effective breaking-out is a breaking-out which limits the risk that the internal zone of the glass sheet breaks during the operation of breaking out the margin(s).

To this end, and according to a first aspect, the invention relates to a breaking-out method according to claim 1. Said method produces breaking out at least one part to be broken out, referred to as a "margin", in a glass sheet, previously bearing at least one cutting line, separating said at least one margin from an internal zone of said glass sheet. Said method includes, after the production of said at least one cutting line, the steps of:

- gripping the glass sheet only in said internal zone, so as to hold the glass sheet in a position in which vibrations are able to propagate on the surface of said internal zone until said at least one cutting line is reached,
- vibrating said internal zone.

The holding of said internal zone is continued during the step of vibrating said internal zone.

Gripping on the internal zone only advantageously makes it possible to achieve the holding according to said position (also called the "vibration position" below), so that vibrations transmitted at said internal zone are able to propagate to the whole of the surface of the glass sheet, and therefore in particular in the direction of said at least one cutting line.

It follows from this that the positions envisaged for breaking out in the prior art are not vibration positions within the meaning of the invention, insofar as they do not allow such propagation of vibrations (for example because of a surface/a fulcrum against which the glass sheet rests on a cutting line).

Furthermore, vibrating the internal zone therefore makes it possible to propagate vibrations from the internal zone towards said at least one cutting line. This has the advantageous effect, as noted by the inventors, of breaking out said at least one margin simultaneously. It is therefore not necessary to consider breaking out the margins one by one, so the invention saves a substantial amount of time in the process of manufacturing a glass part.

Preferably, the vibration is only applied to said internal zone. Vibrating only the internal zone, without vibrating any margin, makes it possible to limit vibration interference and thus makes it possible to limit the risk of breaking the internal zone of the glass sheet.

In principle, said internal zone excludes the cutting line; the gripping and the holding of the glass sheet is therefore not on the cutting line and the vibration is therefore not applied to the cutting line.

Another advantageous effect of vibration breaking-out according to the invention in said internal zone is that said at least one margin is broken in a clean, precise manner (that is without chipping).

Finally, and this is a fundamental distinctive aspect in comparison with the solutions of the prior art, the breaking-out according to the invention is implemented regardless of the shape (simple and/or complex) of said at least one margin. In particular, the invention makes it possible to consider the most complex shapes, in particular geometries with small concave radii of curvature.

The method according to the invention is thus based on the surprising discovery that although the internal zone of the glass sheet is the zone to which the most attention must be paid, since it is the zone with commercial value, it is possible to apply to it at least one bending wave in order to perform the breaking-out.

In particular embodiments, the breaking-out method may further include one or more of the following features, taken alone or in any technically feasible combinations.

In particular embodiments, in order to obtain an even more effective breaking-out, vibrating said internal zone includes creating a bending wave at a frequency between 1 Hz and 100 Hz, preferably between 5 Hz and 95 Hz, said bending wave:

- being repeated, or
- being amplified by modulating the frequency in the range between 1 Hz and 100 Hz, or even between 5 Hz and 95 Hz or by modulating the striking force.

In particular embodiments, in order to obtain an even more effective breaking-out, the vibrating of said internal zone is carried out by applying a force between 20 N and 100 N; applying a low relative force simplifies the implementation of the breaking out.

Using of low frequencies, between 1 Hz and 100 Hz, or even between 5 Hz and 95 Hz advantageously makes it possible to avoid the formation of nodes in the bending waves and limits the risk of destruction of the internal zone of the glass sheet by the vibration.

In particular embodiments, the gripping and holding of said internal zone as well as the vibrating of said internal zone are performed on the same face of the glass sheet, for example respectively in a gripping and holding zone as well as in a distinct vibration zone or else non-empty intersection.

In particular embodiments, the gripping and holding of said internal zone as well as the vibrating of said internal zone are performed on two opposite faces of the glass sheet.

In particular embodiments, at least part of the edge of the glass sheet, "called free part", does not include a margin intended to be broken out, the gripping and holding of said internal zone being made on one face of the glass sheet, the vibrating of said internal zone being performed at the edge of said at least one free part.

In particular embodiments, at least part of the edge of the glass sheet, "called free part", does not include a margin intended to be broken out, the gripping and holding of said internal zone as well as the vibration of said internal zone being both performed at the edge of said at least one free part.

In particular embodiments, said internal zone is vibrated perpendicularly or obliquely to the internal zone.

In particular embodiments, the glass sheet is provided with one or more coating layers.

As is known, a coating layer is configured to provide functionality to the glass (for example reinforced insulation, solar control, antireflective properties, self-cleaning properties, hydrophobic properties, etc.).

In particular embodiments, the glass sheet includes a plurality of margins intended to be broken out.

In particular embodiments, said internal zone is vibrated by vibration means placed in contact with the internal zone, said device being one of at least:

- a device including a piston driven by compressed air,
- a vibrating music speaker,
- an out-of-balance motor.

In particular embodiments, said at least one cutting line is produced during a step of cutting of said breaking-out method.

According to a second aspect, the invention relates to a system for breaking out at least one part to be broken, referred to as a "margin", in a glass sheet bearing at least one cutting line separating said at least one margin from an internal zone of said glass sheet according to claim 12. This system is a system for implementing the method according to the invention. Said system includes:

- gripping and holding means configured to grip the glass sheet only in the internal zone and to hold the glass sheet in a position in which vibrations are able to propagate on the surface of said internal zone until said at least one cutting line is reached,
- means for vibrating said internal zone.

Said vibration means of said internal zone are different from the gripping and holding means and are different from the means for tracing the cutting line.

Said breaking-out system inherits the aforementioned advantages with reference to the breaking-out method according to the invention.

In particular embodiments, the breaking-out system may further include one or more of the following features, taken alone or in any technically feasible combinations.

In particular embodiments, the glass sheet includes a plurality of margins intended to be broken out.

In particular embodiments, the vibration means are one of at least:

- a device including a piston driven by compressed air,
- a vibrating music speaker,
- an out-of-balance motor.

In particular embodiments, the vibration means are secured to the gripping and holding means.

Having vibration means secured to the gripping and holding means advantageously makes it possible to facilitate the production of the invention as well as the implementation of the breaking-out method, while reducing costs.

BRIEF DESCRIPTION OF THE DRAWINGS

Other features and advantages of the present invention will emerge from the non-limiting description given below, with reference to the appended drawings that illustrate an exemplary embodiment thereof. In the figures.

DESCRIPTION OF EMBODIMENTS

Figure 1:
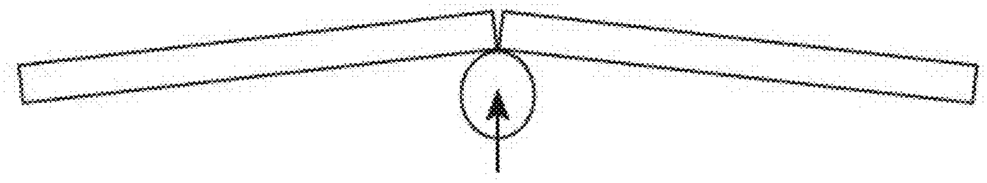
FIG. 1 schematically depicts a rectilinear reverse breaking-out technique according to the prior art.
Figure 2A:
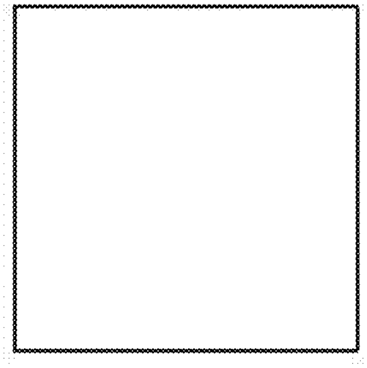
FIG. 2 includes four FIGS. 2*a*, 2*b*, 2*c* and 2*d* which schematically represent the different steps leading to the breaking-out of margins of complex shapes according to the prior art.
Figure 2B:
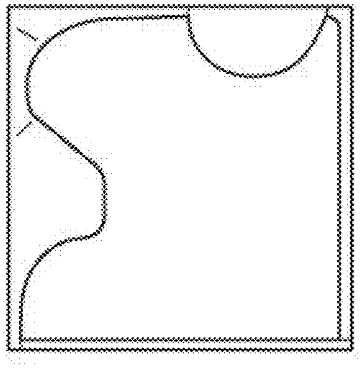
Figure 2C:
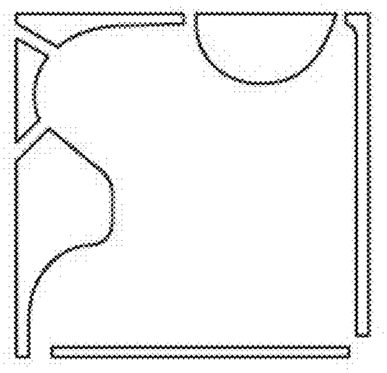
Figure 2D:
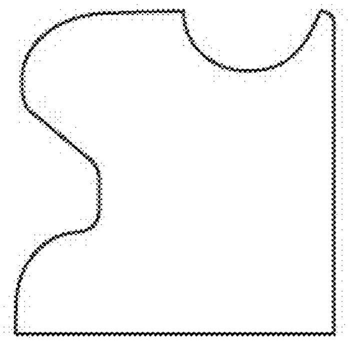
Figure 3A:
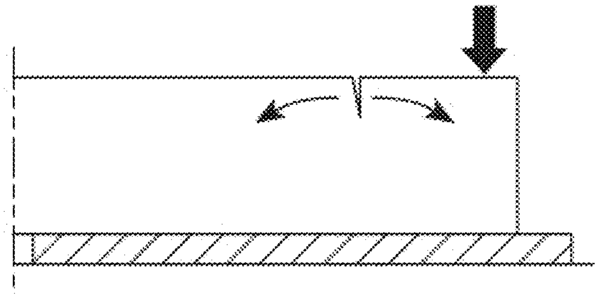
FIG. 3 includes four FIGS. 3*a*, 3*b*, 3*c* and 3*d* which schematically represent, in cross-section, the-breaking out of a margin of a glass sheet by bending a cutting line of complex shape using a bending of the corresponding margin.
Figure 3B:
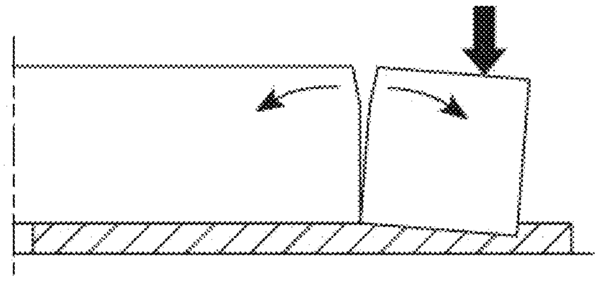
Figure 3C:
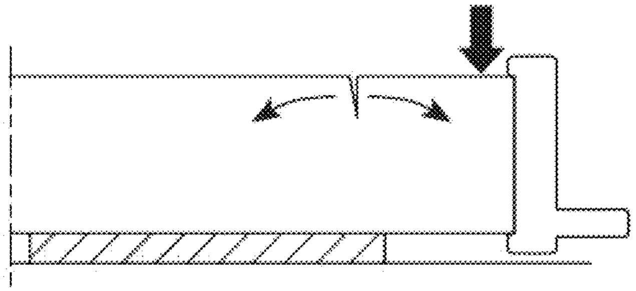
Figure 3D:
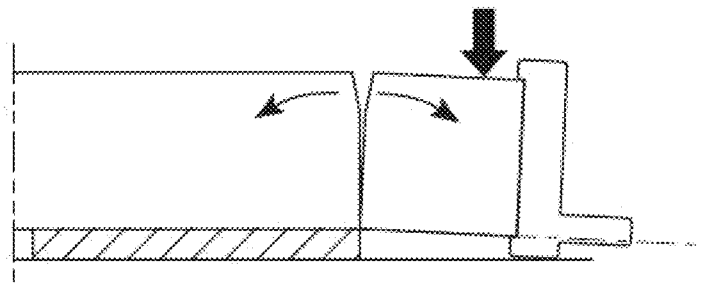
Figure 4A:
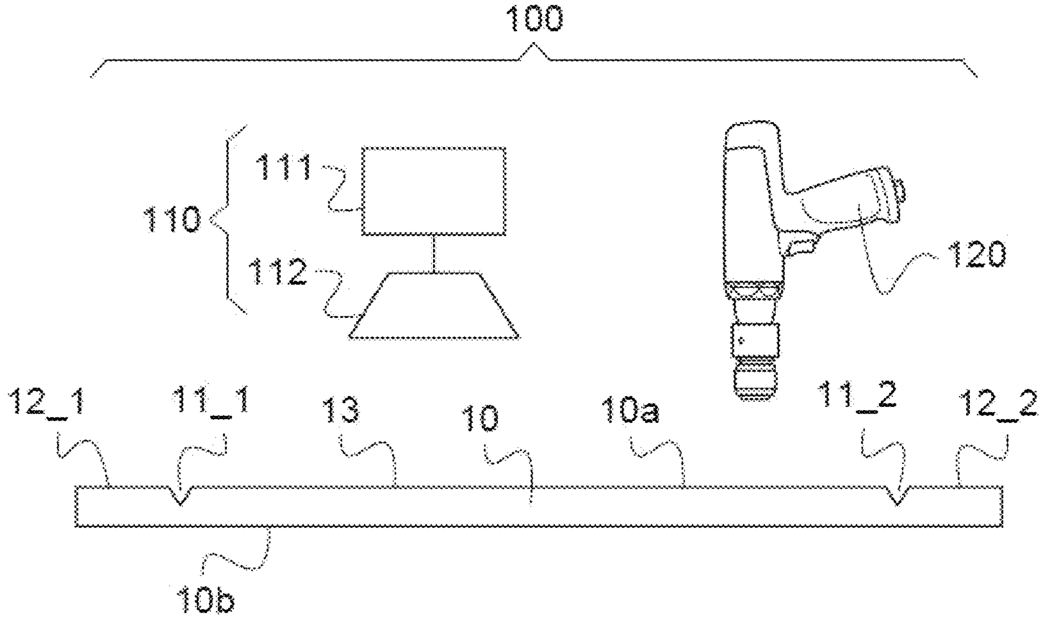
FIG. 4*a* schematically depicts, in its environment and in a transverse sectional view, a particular embodiment of a system for breaking out margins in a glass sheet.
Figure 4B:
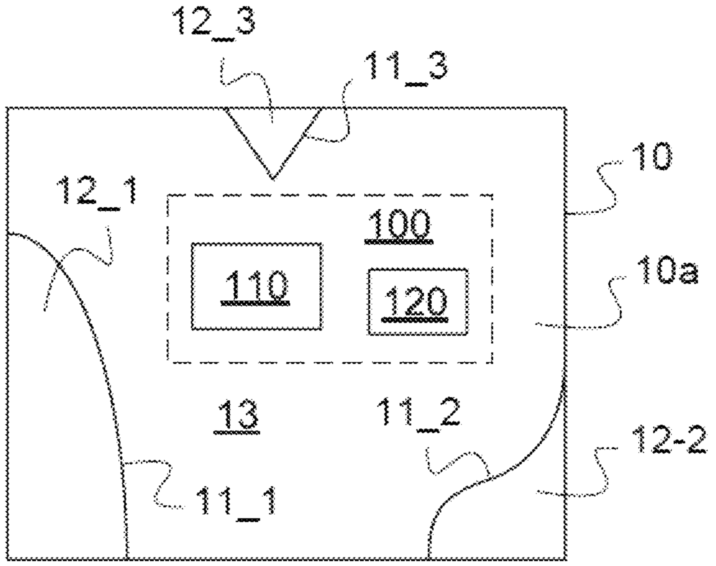
FIG. 4*b* is a top view of the system of FIG. 4*a;*

FIGS. 4*a* and 4*b* schematically represent, in its environment, a particular embodiment of a system 100 for breaking out margins in a glass sheet 10 according to the invention.

FIG. 4*a* (respectively FIG. 4*b*) corresponds more particularly to a transverse sectional view (respectively, to a top view) of said breaking-out system 100.

In order to break out the margins of the glass sheet 10, the breaking-out system 100 according to the invention is in particular configured to implement a breaking-out method according to the invention and described in greater detail below.

In the embodiment of the present embodiment, it is in no way limiting that the glass sheet 10 is flat and corresponds to a float glass panel obtained in a manner known per se and intended for the manufacture of a glazed unit.

Said glazed unit is for example more particularly intended for the automotive field (example: side glazed unit of a car), or in the field of housing construction (example: glazed unit involved in the production of a window of a house). In general, no limitation is attached to the industrial application considered for said glazed unit.

Similarly, considering a float glass panel is only one variant embodiment of the invention. Thus, any type of glass that can be subject to breaking out from previously delimited margin(s) by means of cutting line(s) can be envisaged within the meaning of the invention. In particular, the glass in question may be any of soda-lime glass, borosilicate glass, glass-ceramic, etc.

It is also noted that the dimensions of the glass sheet 10 are not limiting to the invention. Thus, the float glass panel for example has dimensions, in terms of length and width, so as to fall within one of the categories known to those skilled in the art and called "PLF" or "DLF". The absence of dimensional limitations also extends to the thickness of the glass sheet 10, which may for example be between 0.7 mm and 6 mm, but also be greater than 6 mm.

According to a more particular embodiment of the invention, the glass sheet 10 includes one or more coating layers. As is known, a coating layer is configured to provide functionality to the glass (for example reinforced insulation, solar control, antireflective properties, self-cleaning properties, hydrophobic properties, etc.).

In the present embodiment, and as illustrated in a non-limiting way by FIG. 4*b*, the glass sheet 10 carries a plurality of margins 12_1, 12_2, 12_3 intended to be broken by means of the breaking-out system 100. To that end, the glass sheet 10 was conveyed to a breaking-out station (not shown in the figures) where it is now resting immobile on a surface, called the "waiting surface", while waiting for the implementation of the breaking-out method.

The result of the presence of said margins 12_1, 12_2, 12_3 is that the glass sheet 10 bears a plurality of cutting lines 11_1, 11_2, 11_3. Each cutting line 11_*i* (i being an integer index between 1 and 3) contributes to the contour of the margin 12_*i*, and, furthermore, separates the margin 12_*i* from an internal zone 13 of the glass sheet 10.

It will therefore be understood that said internal zone 13 corresponds to the final shape desired for the glazed unit intended to be manufactured. In other words, the internal zone 13 corresponds to the part of the glass sheet 10 which is complementary to the margins 12_*i*. These are therefore parts of the upper 10*a* and lower 10*b* faces, as well as the part or parts of the edge (side face) of the glass sheet 10, where appropriate (that is if at least one part of the edge of the glass sheet 10 does not include a margin intended to be broken) which are complementary to said margins 12_*i.*

It should be noted that although a plurality of margins 12_*i* is considered in the embodiment described herein, the invention of course remains applicable in the case where a single margin is intended to be broken.

Conventionally, the cutting lines 11_*i* are made during a cutting step, each cutting line 11_*i* being a fissure intended to allow breaking out along this line during a dedicated step of the breaking-out method according to the invention and described in greater detail below. This then is a partial cut, that is a cut through just part of the thickness of the glass sheet 10.

The cutting lines 11_*i* are traced for example using a glass-cutting wheel or any other suitable scoring tool such as a laser for example.

Conventionally, and as illustrated by FIG. 4*b*, the cutting lines 11_*i* are made on the same face, called "upper face 10*a*", of the glass sheet 10. It should be noted that the terms "upper face 10*a*" here refer to the fact that said face 10*a* is opposite a lower face 10*b* in contact with the waiting surface of the breaking-out station.

In the present embodiment, the respective shapes of the margins 12_*i* are complex shapes. The term "complex shape" refers here to a curved line, or to a succession of lines, some of which are not rectilinear, or to rectilinear lines with changes of direction forming at least one concave part. Thus, a complex shape may correspond to (or include) a notch, as is more particularly the case of the margin 12_3.

It should however be noted that considering complex shapes for the margins 12_*i* of the glass sheet 10 is only one variant embodiment of the invention. The invention of course remains applicable in the case where one or more margins are of simple shapes.

It can also be observed in FIG. 4*b* that the margins 12_*i* considered here are all separated from one another. However, there is nothing to exclude envisaging margins having all or some of their respective contours be in common.

By way of purely illustrative example of an implementation of the step of cutting, for a standard soda-lime float glass sheet of thickness 3.15 mm, the following parameters can be used to produce cutting lines:

Cutter wheel: angle 150°, width=1 mm, diameter: 5 mm;

Cutter wheel travel speed: 100 m/min;

Force exerted on the glass=50N;

Cutter wheel penetration into the glass: 4/100 mm.

It should be noted that the invention is described here by assuming that the cutting lines 11_*i* are made in the glass sheet 10 prior to the implementation of the breaking-out method. This in particular implies that, in the present embodiment, the breaking-out system 100 does not include means configured to carry out the cutting step mentioned above (example: cutting station of a configuration known per se), and that, a fortiori, this cutting step is not included in the breaking-out method.

However, such arrangements are not limiting to the invention, and there is nothing to exclude other embodiments in which the breaking-out system 100 includes means configured to perform the cutting step, and where the cutting step is therefore performed during the implementation of the breaking-out method.

According to the invention, and with the aim of allowing the breaking-out of the margins 12_*i*, the breaking-out system 100 includes means 110 for gripping and holding the glass sheet 10, as well as vibration means 120.

The gripping and holding means 110 are more particularly configured to grip the glass sheet 10 only in the internal zone 13 as well as to hold the glass sheet 10 in a position (called the "vibration position" in the rest of the description) in which vibrations are able to propagate on the surface of said internal zone 13 until they reach the cutting lines 11_*i*.

In the present embodiment, and as illustrated by FIGS. 4*a* and 4*b*, said gripping and holding means 110 correspond to a suction cup-type air suction system 110 (one or more suction cups can be envisaged) capable of grasping by vacuum. More particularly, said system 110 includes a Venturi vacuum pump 111 connected to a suction cup 112.

Using such a suction system 110 is carried out by placing the suction cup 112 in contact with the internal zone 13 of the glass sheet 10, at the upper face 10*a*. In this way, the glass sheet 10 is sucked, after activation of the vacuum pump 111, from the waiting surface of the breaking-out station and held in a high position (that is away) relative to said waiting surface.

The design of such a system is known and is consequently not described further here. It should also be noted that it is possible to consider another pump, such as a rotary vacuum pump, as well as the use of a plurality of suction cups.

Furthermore, a person skilled in the art is also able to determine the different parameters allowing the implementation of such a system in the application framework considered here. In particular, it knows how to choose the size(s) of the suction cup(s) as a function of the area of the internal zone 13 (for example so as to produce a grip and a hold on a zone whose area is 25% lower than that of the glass sheet 10), as well as the suction power as a function of the dimensional and weight characteristics of the glass sheet 10.

It is also understood that the fact of gripping at only the internal zone 13 advantageously makes it possible to achieve the hold according to said vibration position, so that vibrations transmitted at said internal zone 13 are able to propagate throughout the surface of the glass sheet 10, and therefore in particular in the direction of the cutting lines 11_*i*. It follows from this that the positions envisaged for breaking out in the prior art are not vibration positions within the meaning of the invention, insofar as they do not allow such propagation of the vibrations (for example because of a surface/a fulcrum against which the glass sheet rests on a cutting line).

Such an example of an air suction system 110 by suction cups is however only an alternative embodiment of the invention. Other variants remain conceivable. For example, in cases where at least part of the edge of the glass sheet 10, "called free part", does not include a margin intended to be broken, the gripping and holding means 110 may include a clamp able to tighten the glass sheet 10 on either side of said upper 10*a* and lower 10*b* faces, at the edge of said at least one free part. Such a clamp can for example be connected to a robotic mechanical arm.

In general, no limitation is attached to the nature of said gripping and holding means 110, as long as they are able to grip the glass sheet 10 only in the internal zone 13 as well as to hold it in the vibration position.

This absence of limitation also applies to the vibration means 120. In other words, any means capable of generating vibrations (these vibrations being intended to be transmitted to the internal zone 13 of the glass sheet 10, in order to then propagate to the cutting lines 11_*i*) and known to those skilled in the art can be envisaged. In particular, the wave nature of the vibrations (mechanical, acoustic) does not constitute a limiting factor of the invention.

Thus, in the embodiment described here and illustrated by FIGS. 4*a* and 4*b*, said vibration means 120 are a device including a piston driven by compressed air. It may typically be a gun of the air-hammer type, for example one configured to vibrate at a variable frequency, which may vary from 5 to 50 Hz. For example, it is possible to create a bending wave at a frequency of approximately 10 Hz and then to modulate this frequency to approximately 50 Hz until the margin has been separated. This separation is very rapid (in less than two seconds) and very clean. The breaking-out is thus very effective.

In general, any "industrial vibrator" device (also called an "exciter") can be envisaged, such as for example an out-of-balance motor.

According to another embodiment, said vibration means 120 are a vibrating music speaker. Such a vibrating music speaker makes it possible, in a manner known per se, to vibrate the surfaces with which it is placed in contact (principle of a resonance loudspeaker).

Furthermore, there is nothing to preclude vibrating by means of acoustic waves transmitted remotely (unlike said music speaker intended to be placed in contact with the internal zone 13) and directed toward the internal zone 13. Finally, no limitation is attached to the frequency used to generate said acoustic waves. Preferably, the frequency used is chosen close to the resonance frequency of the glass sheet 10.

It should be noted that the invention covers particular embodiments in which the gripping and holding means 110 are separate from (that is, not secured to) the vibration means 120 (which is the case in the current matter of the embodiment of FIGS. 4*a* and 4*b*). It is therefore understood that, for such embodiments, the gripping and holding is performed in a gripping zone separate from a vibration zone in which the vibration is made. In other words, in such embodiments, and if the gripping and holding as well as the vibrating are performed on the same face of the glass sheet 10 (for example the upper face 10*a*), said gripping zone does not occupy the entire surface of the internal zone 13, so as to leave a vacant space useful for the vibration zone.

This being the case, the invention also covers other embodiments in which the vibration means 120 are connected (that is, co-operate securely) to the gripping and holding means 110, such that said gripping and holding zones, although located on the same face of the glass sheet 10, are of non-empty intersection (for example the vibration zone is included in the gripping zone).

For example, the vibration means 120 may be pneumatic and integrated into a suction system (for example pneumatic vibrator such as those installed on hoppers, silos, bin, mixers, metering units and used to unload/sort powders/grains that tend to clump).

It is also possible to envisage securing (for example by hardware integration) a vibrating music speaker or an out-of-balance motor to gripping and holding means 110.

Having vibration means 120 secured to the gripping and holding means 110 advantageously makes it possible to facilitate the production of the invention as well as the implementation of the breaking-out method, while reducing costs.

Furthermore, another aspect of the embodiment described here lies in the fact that the gripping and holding means 110 as well as the vibration means 120 are configured to automatically perform processing operations making it possible to break out the margins 12_*i*, by implementing steps of the breaking-out method.

For this purpose, the gripping and holding means 110 (respectively the vibration means 120) include for example a processing circuit (not shown in the figures) including one or more processors and storage means (magnetic hard disk, electronic memory, optical disk, etc.) in which data and a computer program product are stored in the form of a set of program code instructions to be executed to implement at least some of the steps of the breaking-out method.

Alternatively or additionally, the processing circuit includes one or more programmable logic circuits (FPGA, PLD, etc.), and/or one or more specialized integrated circuits (ASIC), and/or a set of discrete electronic components, etc. adapted to implement at least some of the steps of the breaking-out method.

In other words, the processing circuit of the gripping and holding means 110 (respectively vibrating means 120) corresponds to a set of means configured in a software way (specific computer program product) and/or hardware way (FPGA, PLD, ASIC, etc.) to control said gripping and holding means 110 (respectively said vibration means 120), so as to implement at least some of the steps of the breaking-out method.

It should be noted that in the embodiment described here, the means 110 for gripping and holding (respectively the vibration means 120) also include communication means (not illustrated in the figures), wired or wireless, and using any communication protocol known to a person skilled in the art. In this way, the gripping and holding means 110 can communicate with the vibration means 120 so as to perform the steps of the breaking-out method in a coordinated manner.

Finally, to allow automated implementation, the gripping and holding means 110 (respectively the vibration means 120) further include movement means (not shown in the figures) configured to bring the suction cup 112 closer to/further from the glass sheet 10 (respectively to bring the vibration means 120 closer to/further from the glass sheet 10). By way of non-limiting example, said movement means include a motor as well as guide means, such as a rail for example.

However, nothing precludes the gripping and holding means 110 and/or the vibration means 120 from being controlled by a third-party entity that may or may not belong to the breaking-out system 100.

Furthermore, as an alternative to a fully automated implementation of the breaking-out method, it is also possible to consider, according to other embodiments, a manual use of said gripping and holding means 110 and/or said vibration means 120, for example by a qualified operator.

Figure 5:
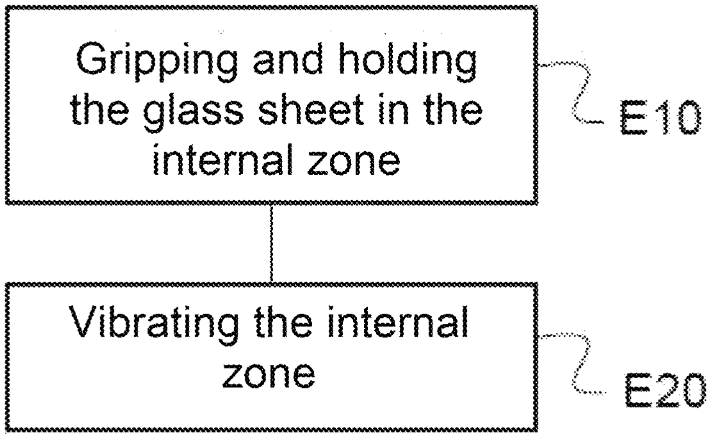
FIG. 5 shows, in flowchart form, a particular embodiment of a breaking-out method by the breaking-out system of FIGS. 4*a* and 4*b*.

FIG. 5 shows, in flowchart form, a particular embodiment of said breaking-out method by the breaking-out system 100 of FIGS. 4*a* and 4*b*.

For the description of said breaking-out method, it is recalled that it is considered in no way limiting that the gripping and holding means 110 are an air suction system 110 including a Venturi vacuum pump 111 and a suction cup 112. The vibration means 120, meanwhile, are an air hammer 120.

It is also recalled that it is considered in a non-limiting way that the cutting lines 11_*i* are made on the upper face 10*a* prior to the implementation of the breaking-out method.

Also, said breaking-out method first includes a step E10 gripping the glass sheet 10 only in the internal zone 13, so as to hold the glass sheet 10 in the vibration position. Said step E10 is implemented by the gripping and holding means 110.

More particularly, in the present embodiment, said step E10 includes:

- moving the gripping and holding means 110 so as to place the suction cup 112 in contact, in the internal zone 13, with the upper face 10*a* of the glass sheet 10,
- activating the Venturi vacuum pump 111,
- moving the gripping and holding means 110, while the Venturi vacuum pump 111 is kept activated, to move the glass sheet 10 away from the waiting surface of the breaking-out station.

It should be noted that nothing precludes other embodiments in which the suction cup 112 is already in contact, in the internal zone 13, with the upper face 10*a* of the glass sheet 10 before the activation of the Venturi vacuum pump 111.

Following step E10, the breaking-out method also includes a step E20 of vibrating the internal zone 13. Said step E20 is implemented by the gripping and holding means 120.

It should be noted that the vibrating can just as well be performed perpendicularly to the internal zone 13, this aspect not being limiting to the invention. In addition, these arrangements apply regardless of the vibration means 120 used.

More particularly, in the present embodiment, said step E20 of vibrating includes:

- moving the air hammer 120 such that it is placed in contact (perpendicularly or obliquely) with the internal zone 13,
- activating the air hammer 120. It will, of course, be understood that this activation is implemented even though the glass sheet 10 is held in the vibration position by the gripping and holding means 110.

In a manner similar to what has been mentioned hereinabove regarding the gripping and holding means 110, there is nothing to exclude other embodiments in which the air hammer 120 is already in contact, in the internal zone 13, with the upper face 10*a* of the glass sheet 10 before its activation.

Vibrating the internal zone 13 therefore makes it possible to propagate vibrations from the internal zone 13 to the cutting lines 11_*i*. This has the effect of breaking all the margins 12_*i* simultaneously. Another advantageous vibration breaking-out effect according to the invention is, as the inventors have observed, that the margins 12_*i* are broken in a clean, precise manner (that is without flaking).

Finally, and this is a fundamental distinctive aspect in comparison with the solutions of the prior art, the breaking-out of margins according to the invention is implemented regardless of the shape (simple and/or complex) of said margins. In particular, the invention makes it possible to consider the most complex shapes, in particular geometries with small concave radii of curvature.

It therefore emerges from the foregoing that the fundamental aspects of the breaking-out method according to the invention lie in the fact that the glass sheet is first arranged in the vibration position, and that it is then vibrated at the internal zone 13 thereof.

It is therefore understood that, depending on whether such or such gripping and holding means 110 are used as described above, as well as such or such vibration means 120 as described above, it is possible to consider embodiments that differ from that described with reference to FIG. 5 and for which the gripping and holding as well as the vibration are performed on the same face of the glass sheet.

Thus, in a variant embodiment, the gripping and holding as well as the vibrating are performed on two opposite faces of the glass sheet. For example, the gripping and holding are performed on the upper face 10*a* of the glass sheet 10, while the vibration is performed on the lower face 10*b*.

According to another alternative embodiment, when the edge of the glass sheet 10 includes at least one free part, the gripping and holding are performed on one face of the glass sheet, for example the upper face 10*a*, and the vibrating is performed at the edge of said at least one free part, for example thanks to pneumatic vibration means 120.

According to yet another variant, when the edge of the glass sheet 10 includes at least one free part, the gripping and holding as well as the vibrating are performed at the edge of said at least one free part. By way of example, by repeating the case described above where the gripping and holding means 110 include a clamp able to clamp the glass sheet 10 on either side of said upper 10*a* and lower 10*b* faces, at the edge of said at least one free part, said clamp can be configured to vibrate (for example thanks to a robotic mechanical arm to which it is connected and which generates the vibrations).

The invention claimed is:

1. A method for breaking out at least one part to be broken, forming at least one margin, in a glass sheet bearing at least one cutting line separating said at least one margin from an internal zone of said glass sheet, said method comprising:

- gripping the glass sheet only in said internal zone, so as to hold the glass sheet in a position in which vibrations able to propagate on a surface of said internal zone until said at least one cutting line is reached, and
- vibrating said internal zone.

2. The method according to claim 1, wherein the vibrating of said internal zone includes creating a bending wave at a frequency between 1 Hz and 100 Hz, said bending wave being repeated, or being amplified by modulating the frequency in the range between 1 Hz and 100 Hz or by modulating the striking force.

3. The method according to claim 2, wherein the vibrating of said internal zone includes creating a bending wave at a frequency between 5 Hz and 95 Hz.

4. The method according to claim 2, wherein said bending wave is repeated or amplified by modulating the frequency in the range between 5 Hz and 95 Hz.

5. The method according to claim 1, wherein the gripping and holding of said internal zone as well as the vibrating of said internal zone are performed on a same face of the glass sheet.

6. The method according to claim 5, wherein the gripping and holding of said internal zone as well as the vibrating of said internal zone are performed on the same face of the glass sheet in a gripping and holding zone as well as in a distinct vibration zone or else non-empty intersection.

7. The method according to claim 1, wherein the gripping and holding of said internal zone as well as the vibrating of said internal zone are carried out on two opposite faces of the glass sheet.

8. The method according to claim 1, wherein at least part of an edge of the glass sheet, forming a free part, does not include a margin intended to be broken out, the gripping and holding of said internal zone being performed on one face of the glass sheet, the vibrating of said internal zone being performed at the edge of said at least one free part.

9. The method according to claim 1, wherein at least part of an edge of the glass sheet, forming a free part, does not include a margin intended to be broken out, the gripping and holding of said internal zone, as well as the vibrating of said internal zone being performed at the edge of said at least one free part.

10. The method according to claim 1, wherein the vibrating of said internal zone is performed perpendicularly or obliquely to the internal zone.

11. The method according to claim 1, wherein the glass sheet is provided with one or more coating layers.

12. The method according to claim 1, wherein the glass sheet includes a plurality of margins intended to be broken.

13. The method according to claim 1, wherein the vibrating of said internal zone is performed by vibration means placed in contact with the internal zone, said device being one of at least:

a device including a piston driven by compressed air,
a vibrating music speaker,
an out-of-balance motor.

14. The method according to claim 1, wherein said at least one cutting line is carried out during a cutting step of said breaking-out method.

15. A system for breaking out at least one part to be broken out, forming at least one margin, in a glass sheet bearing at least one cutting line separating said at least one margin from an internal zone of said glass sheet, said system comprising:

gripping and holding means configured to grip the glass sheet only in the internal zone as well as to hold the glass sheet in a position in which vibrations are able to propagate on the surface of said internal zone until said at least one cutting line is reached,
means for vibrating said internal zone.

16. The system according to claim 15, wherein the glass sheet includes a plurality of margins intended to be broken out.

17. The system according to claim 15, wherein the vibration means are one of at least:

a device including a piston driven by compressed air,
a vibrating music speaker,
an out-of-balance motor.

18. The system according to claim 15, wherein the vibration means are secured to the gripping and holding means.

* * * * *